United States Patent Office 3,145,774
Patented Aug. 25, 1964

3,145,774
CEMENT FOR WELLS
Freeman D. Patchen, Dallas, Tex., assignor to Socony Mobil Oil Company, Inc., a corporation of New York
No Drawing. Filed Jan. 17, 1963, Ser. No. 252,052
9 Claims. (Cl. 166—31)

This invention relates to cements and relates more particularly to an emulsion cement for use in wells.

In the application of hydraulic cement slurry to porous bodies, the tendency of the slurry to lose fluid creates difficulties. Thus, for example, in the cementing of wells, with loss of fluid from an aqueous cement slurry to porous subterranean formations, stiffening or premature setting of the cement often occurs with attendant difficulty or impossibility of completing the cementing operation, reduction in the permeability of the formation, swelling or erosion of shale formations, reduced strength of the cement, or other undesired results. Accordingly, the loss of fluid from hydraulic cement slurry desirably should be as low as possible.

In the application of hydraulic cement slurry, it is also desirable that the time required for setting of the cement be sufficiently long to permit placing of the cement slurry. Thus, for example, again in the cementing of wells, relatively long periods of time are often required to pump the cement slurry into place. Further, high temperatures are often encountered which decrease the setting time of the cement. Accordingly, the setting time of the cement should be such as to permit pumping of sufficient amounts of the cement slurry from the surface of the ground to the desired position in the well.

An appreciable improvement with respect to reducing the fluid loss and increasing the setting time of hydraulic cement slurry is effected by employing, as the liquid phase of the slurry, a water-in-oil emulsion containing a suitable emulsifier. However, further improvement in reducing fluid loss and increasing setting time is desired on occasion. Additionally, increase in the initial compressive strength of these emulsion cement slurries is desired on occasion.

It is an object of this invention to reduce the fluid loss of water-in-oil emulsion cement slurry. It is another object of this invention to increase the setting time of water-in-oil emulsion cement slurry. It is another object of this invention to increase the initial compressive strength of water-in-oil emulsion cement. Other objects of the invention will become apparent from the following detailed description.

In accordance with the invention, there is provided a slurry comprising a hydraulic cement, a water-in-oil emulsion, and an emulsifier for water-in-oil emulsions nad containing in admixture therewith finely ground silica.

In emulsion cement slurries, the water-in-oil emulsion is the liquid phase. The oil in the emulsion is the continuous phase and the water in the emulsion is held in suspension in the form of small droplets. Setting of the cement will not occur as long as the oil in the emulsion remains as the continuous phase. It is considered that this effect results from inability of the dispersed water phase to contact and hydrate the cement. With breaking of the emulsion, or inversion of the emulsion, i.e., conversion of the water-in-oil emulsion to an oil-in-water emulsion with the water as the continuous phase, the water becomes capable of contacting and hydrating the cement and setting of the cement begins. Stability with respect to time of the water-in-oil emulsion is a function of temperature, the amount and properties of the emulsifier, the water-to-oil ratio, and the ratio of emulsion to hydraulic cement. Thus, the time that setting of the cement is delayed is amenable to control.

Any type of hydraulic cement may be employed in the emulsion cement slurry. By hydraulic cement is meant a cement which will set under the action of water. Preferably, Portland cement is employed. However, any mixture containing lime, silica, and alumina, and commonly used as a hydraulic cement, is satisfactory.

The oil employed in the liquid phase of the cement slurry, namely, the water-in-oil emulsion, is preferably a hydrocarbon oil. Suitable hydrocarbon oils comprise crude oil, Diesel oil, kerosene, gas oil, distillate oil, and other petroleum oils. Where hydrocarbon oils are employed, however, it is preferred that the composition of the oil be such as to prevent excessive evaporation under the conditions of use. Vegetable oils may be used, if desired. Thus, cottonseed oil, castor oil, rapeseed oil, tung oil, linseed oil, and other types of vegetable oils may be employed. Animal oils such as sperm oil and other fish oils may also be employed.

The water-in-oil emulsion may contain between about 10 percent and about 75 percent by volume of oil. With amounts of oil much below about 10 percent by volume of the mixture of water and oil, difficulty is encountered in obtaining a water-in-oil emulsion. On the other hand, with amounts of oil above about 75 percent by volume of the mixture of water and oil, the large volume of the chemically inactive oil in the slurry may severely reduce the strength of the set cement. Preferably, the emulsion contains between about 20 and 40 percent by volume of oil.

The amount of emulsion with respect to the total amount of undissolved solids in the slurry may vary. Thus, for example, the slurry may contain as little as about 30 parts by weight of emulsion to 100 parts by weight of hydraulic cement and finely ground silica combined. The slurry may also contain as much as 70 parts by weight of emulsion to 100 parts by weight of hydraulic cement and finely ground silica combined. Preferably, the slurry contains about 50 parts by weight of emulsion to 100 parts by weight of hydraulic cement and finely ground silica combined.

The emulsion contains an emulsifier for water-in-oil emulsions. These emulsifiers are characterized by being surface active, i.e., they have a tendency to concentrate at a water-oil interface, diffuse rapidly through a fluid phase to the water-oil interface, are hydrophobic, and have an orientation in the water-oil interface such as to give the lowest possible free interfacial energy. Also, they are generally more oil-soluble than water-soluble.

Any emulsifier capable of stabilizing a water-in-oil emulsion may be employed. A preferred emulsifier is an oil-soluble sulfonic acid or an oil-soluble derivative thereof. By sulfonic acid is meant an organic compound containing the radical $-SO_2OH$ or $-SO_3H$. The oil-soluble sulfonic acids may be alkyl, aryl, aralkyl, or alkaryl sulfonic acids. These sulfonic acids are obtained by reaction between a suitable hydrocarbon and a sulfonating agent. The hydrocarbon may be in admixture with other hydrocarbons, such as a crude petroleum oil. Sulfonated animal or fish oils or fats may also be used. Satisfactory results have been obtained by employing an oil-soluble petroleum sulfonate or an oil-soluble sulfonated sperm oil. Satisfactory oil-soluble petroleum sulfonates include those commonly referred to as mahogany petroleum sulfonates. Satisfactory petroleum sulfonates are those having molecular weights between 415 and 470. Petroleum sulfonates having other molecular weights may also be employed. A satisfactory sulfonated animal fat is one having a molecular weight between 250 and 600.

Other suitable emulsifiers may also be employed. These emulsifiers include sorbitan monooleate, sorbitan sesquioleate, sorbitan trioleate, sorbitan tristearate, lecithin, amino propyl tallow amine, polyoxyethylene sorbitol tetraoleate, and polyoxyethylene sorbitol pentaoleate.

Mixture of various emulsifiers may be employed, if desired.

The emulsifier is employed in an amount capable of effecting temporary emulsification of the water and this amount may be up to about 10 percent by weight of the emulsion. Preferably, the emulsifying agent is employed in an amount between two and six percent by weight of the emulsion. Satisfactory results have been obtained employing emulsifying agent in the amount of about three to four percent by weight of the emulsion.

In preparation of the slurry, it is preferred that the water and oil be mixed together with the emulsifier to form a stable emulsion and thereafter the hydraulic cement and finely ground silica added to the emulsion. Where this procedure is followed, the emulsion of water, oil, and emulsifier should contain calcium ion, which calcium ion may be provided by including within the mixture a suitable calcium salt such as calcium chloride. In another manner of preparing the slurry, the hydraulic cement and finally ground silica may be admixed with the oil and thereafter the water and emulsifier added. The slurry may also be prepared by admixing the hydraulic cement and finely ground silica with the water and thereafter adding the oil and emulsifier. However, this latter procedure is usually not to be preferred if delay in the addition of the oil and the emulsifier might be encountered.

Where amounts of emulsifier less than about three percent by weight of the emulsion are employed, difficulty is encountered occasionally in obtaining an emulsion wherein the oil is the continuous phase. Difficulty along this line can be avoided by first admixing all of the emulsifier with all of the oil. Thereafter, the solids, i.e., the hydraulic cement and the finely ground silica, and the water are added alternately in increments to the oil containing the emulsifier. Usually the increments need not be smaller than about one-quarter the total amount of the hydraulic cement and finely ground silica combined or the water although smaller increments may be employed.

As stated hereinabove, the stability of the water-in-oil emulsion, and thus the time that setting of the cement slurry is delayed, is a function of the temperature, the amount and properties of the emulsifier, the water-to-oil ratio, and the ratio of emulsion to total undissolved solids. Generally, for any given emulsifying agent, the stability of the emulsion will decrease with increasing temperature. However, the stability will increase with increasing amounts of emulsifying agents. Similarly, the stability will increase with the ratio of oil to water and with ratio of emulsion to total undissolved solids. The effects of the temperature, amount of emulsifying agent, and the ratio of oil to water are interrelated. Additionally, conditions of mixing of the oil, water, and hydraulic cement and finely ground silica, pressure on the slurry thereafter, and the presence of foreign surfaces affect the stability of the emulsion. Accordingly, no quantitative rule can be given with respect to the time the emulsion in any slurry will remain stable. However, for any particular slurry of hydraulic cement and finely ground silica, the time that the emulsion will remain stable may be determined by test either under actual conditions of use or under simulated conditions.

The presence of the finely ground silica in the emulsion cement slurry reduces the fluid loss of the emulsion cement slurry. Additionally, the presence of the finely ground silica increases the setting time of the emulsion cement slurry. Stated otherwise, the finely ground silica retards the setting of the emulsion cement slurry. Additionally, the finely ground silica increases the initial compressive strength of the emulsion cement slurry, i.e., at the end of 24 hours' setting time the compressive strength of the cement is greater.

The silica added to the emulsion cement must be finely ground. By "finely ground," I mean that the silica should be in such a state of subdivision that it will pass through a 100-mesh screen. Of course, the silica may contain larger particles than will pass through a 100-mesh screen but these will be relatively ineffective with respect to the objects of this invention and will function merely as an aggregate. A 100-mesh screen is a screen containing 100 openings per square inch exclusive of the width of the wire forming the screen. The width of the wire is not in excess of .0049 inch. The silica may be ground to a greater extent than that which will pass through a 100-mesh sieve. For example, the silica may be ground to the extent that the greater portion passes through a 200-mesh, or a 325-mesh, screen.

The finely ground silica may be added to the emulsion cement slurry in various amounts. However, the amounts of silica in the emulsion cement slurry should be at least 20 percent by weight of the dry hydraulic cement. The amount of the silica may be as high as 200 percent by weight of the dry hydraulic cement. Preferably, the finely ground silica should be in an amount between 35 and 50 percent by weight of the dry hydraulic cement.

The following example will be illustrative of the invention.

Three cement slurries were prepared in which a water-in-oil emulsion was the entire liquid phase of the cement slurry. The water-in-oil emulsion contained 65 percent by volume of water and 35 percent by volume of Diesel oil. To the emulsion was added, as an emulsifier, three percent by weight of a petroleum sulfonate having a molecular weight range of 415 to 430. To the emulsion was added 1.5 weight percent of calcium chloride. To one of these emulsions was added Portland cement in the amount of 100 parts by weight of Portland cement to 52 parts by weight of emulsion. To the second of these emulsions was added a mixture containing 70 percent by weight of Portland cement and 30 percent by weight of finely ground silica in the amount of 100 parts by weight of the mixture to 52 parts by weight of emulsion. To the third of these emulsions was added a mixture containing 50 percent by weight of Portland cement and 50 percent by weight of finely ground silica in the amount of 100 parts by weight of the mixture to 52 parts by weight of emulsion. The portland cement was ASTM (American Society for Testing Materials) Type I Portland cement. The silica added to the second and third of these emulsions had been ground such that 95 percent passed through a 200-mesh screen.

Three samples of each of the three emulsion cement slurries were permitted to set at different temperatures for a period of 24 hours. At the end of the setting period, the compressive strength of each of the samples was measured. Two other samples of each of the three emulsion cement slurries were tested for thickening time employing the procedure recommended by the American Petroleum Institute for the 14,000 feet and the 16,000 feet schedule. One sample of each of the three emulsion cement slurries was tested for fluid loss employing the procedure recommended by the American Petroleum Institute. The table gives the results obtained.

*Table*

| Composition, parts by Weight | | Compressive Strength, p.s.i. | | | Thickening Time— Minutes | | 30 Min. Fluid- Loss, cc. |
|---|---|---|---|---|---|---|---|
| Cement | Silica Flour | 260° F. 24 hr. | 290° F. 24 hr. | 320° F. 24 hr. | 14,000 Feet | 16,000 Feet | |
| 100 | 0 | 625 | 845 | 750 | 175 | 93 | 0.8 |
| 70 | 30 | 1,100 | 1,230 | 1,325 | 230 | 155 | 0.0 |
| 50 | 50 | 940 | 1,765 | 1,700 | 180 | 210 | 0.2 |

This application is a continuation-in-part of my application, Serial No. 830,462, filed July 30, 1959, and now abandoned.

Having thus described my invention, it will be understood that such description has been given by way of illustration and example and not by way of limitation, reference for the latter purpose being had to the appended claims.

I claim:

1. A slurry comprising a water-in-oil emulsion as the entire liquid phase of said slurry, said emulsion containing between 10 and 75 percent by volume of oil, an emulsifier for water-in-oil emulsion in an amount sufficient to effect a temporary emulsification in said water-in-oil emulsion but not to exceed 10 percent by weight of said emulsion, a hydraulic cement and finely ground silica, the amount of said water-in-oil emulsion in said slurry being between 30 and 70 parts to 100 parts by weight of said hydraulic cement and finely ground silica combined, said finely ground silica being capable of passing through a 100-mesh screen and being in an amount between 20 and 200 percent by weight of said hydraulic cement effective to reduce the fluid loss and increase the setting time of said slurry and to increase the initial compressive strength of said cement.

2. The slurry of claim 1 wherein said hydraulic cement is a mixture containing lime, silica, and alumina.

3. The slurry of claim 1 wherein said hydraulic cement is Portland cement.

4. In the process of treating a well in the earth wherein a slurry of cement is pumped into said well, the steps which include forming a slurry of cement comprising a water-in-oil emulsion as the entire liquid phase of said slurry, said emulsion containing between 10 to 75 percent by volume of oil, an emulsifier for water-in-oil emulsion in an amount sufficient to effect temporary emulsification in said water-in-oil emulsion but not to exceed 10 percent by weight of said emulsion, a hydraulic cement and finely ground silica, the amount of said water-in-oil emulsion in said slurry being between 30 and 70 parts to 100 parts by weight of said hydraulic cement and finely ground silica combined, said finely ground silica being capable of passing through a 100-mesh screen and being in an amount between 20 and 200 percent by weight of said hydraulic cement effective to reduce the fluid loss and increase the setting time of said slurry and to increase the initial compressive strength of said cement, and pumping said slurry into said well.

5. The process of claim 4 wherein said hydraulic cement is a mixture containing lime, silica, and alumina.

6. The process of claim 4 wherein said hydraulic cement is Portland cement.

7. In a process for reducing the fluid loss, increasing the setting time, and increasing the initial compressive strength of a slurry of hydraulic cement, which slurry of hydraulic cement comprises a water-in-oil emulsion as the entire liquid phase of said slurry, said emulsion containing between 10 and 75 percent by volume of oil, an emulsifier for water-in-oil emulsion in an amount sufficient to effect temporary emulsification in said water-in-oil emulsion but not to exceed 10 percent by weight of said emulsion, and a hydraulic cement, the step which comprises adding to said hydraulic cement slurry in an amount between 20 and 200 percent by weight of said hydraulic cement finely ground silica capable of passing through a 100-mesh screen, the amount of said water-in-oil emulsion in the resulting slurry being between 30 and 70 parts to 100 parts by weight of said hydraulic cement and finely ground silica combined.

8. The process of claim 7 wherein said hydraulic cement is a mixture containing lime, silica, and alumina.

9. The process of claim 7 wherein said hydraulic cement is Portland cement.

References Cited in the file of this patent

UNITED STATES PATENTS

| | | |
|---|---|---|
| 2,798,003 | Morgan | July 2, 1957 |
| 2,801,931 | Morgan | Aug. 6, 1957 |
| 2,805,719 | Anderson | Sept. 10, 1957 |
| 2,840,483 | Morgan | June 24, 1958 |
| 2,842,449 | Barden et al. | July 8, 1958 |
| 2,878,875 | Dunlap et al. | Mar. 24, 1959 |

UNITED STATES PATENT OFFICE
CERTIFICATE OF CORRECTION

Patent No. 3,145,774                                                  August 25, 1964

Freeman D. Patchen

It is hereby certified that error appears in the above numbered patent requiring correction and that the said Letters Patent should read as corrected below.

Column 5, line 10, strike out "a"; line 31, for "to" read -- and --; column 6, line 39, for "Barden" read -- Bearden --.

Signed and sealed this 22nd day of December 1964.

(SEAL)
Attest:

ERNEST W. SWIDER                               EDWARD J. BRENNER
Attesting Officer                                      Commissioner of Patents